Patented Aug. 2, 1932

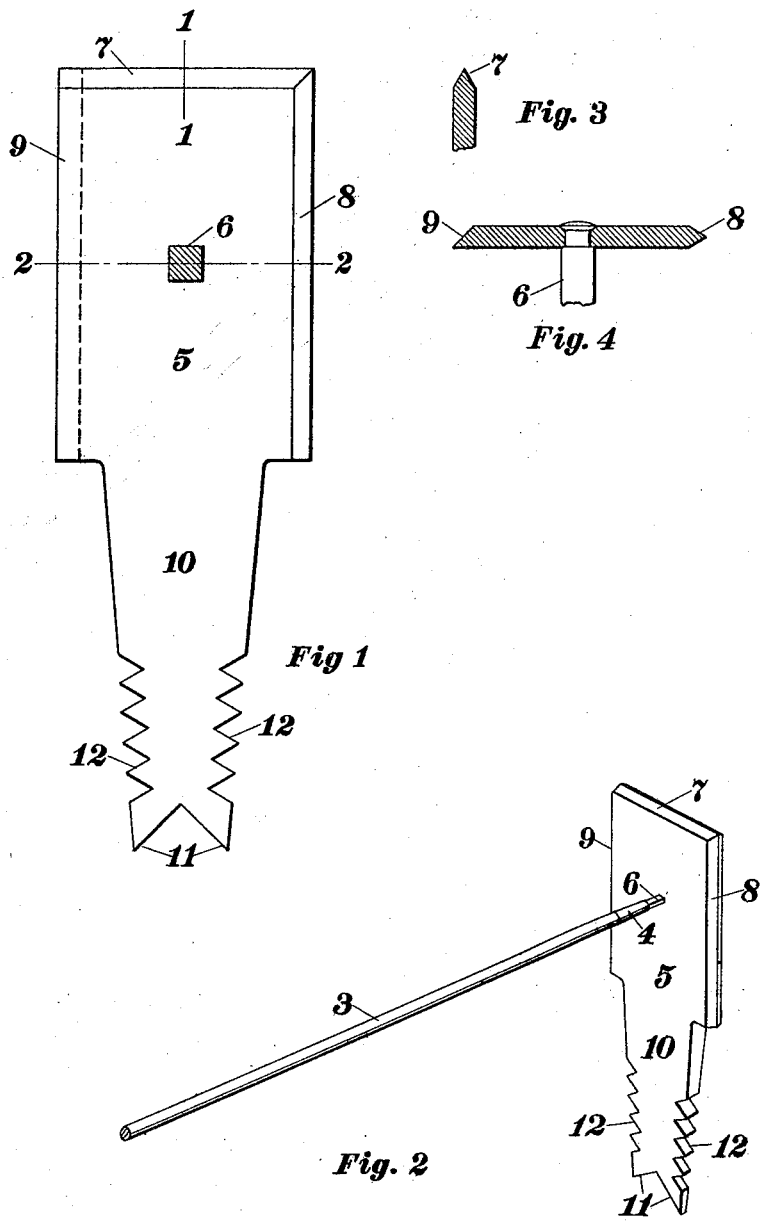

1,869,573

UNITED STATES PATENT OFFICE

WILLIAM McMEANS, OF SCRANTON, PENNSYLVANIA

COMBINATION WEED GRUBBER AND HOE

Application filed November 16, 1931. Serial No. 575,292.

My invention, which is the subject matter of the present application for patent, is designed for weed grubbing, weed cutting and hoeing, and the object of my invention is to provide a device which will destroy weeds growing between rows of closely spaced plants without injuring the plants or disturbing the roots.

In order that my invention may be better understood, reference is had to the accompanying drawing in which—

Fig. 1 is an elevation of the blade, Fig. 2 is a perspective showing blade attached to handle and Figs. 3 and 4 are sections on the lines 1—1 and 2—2 respectively of Fig. 1.

In carrying out the invention there is provided a suitable long wooden handle 3 provided with a ferrule 4. The blade 5 is attached to handle 3 by means of a square shank 6 one end of which is riveted to blade 5 as shown in Fig. 4. The other end of shank 6 is tapered and driven into suitable hole drilled in handle 3.

The handle 3 is located in the exact center of the cutting portion of blade 5 and attached at right angles to blade 5.

The cutting portion of blade is sharpened on the top edge 7 as shown in Fig. 3 and on side edge 8 as shown in Fig. 4. These two edges 7 and 8 form the cutting portion of blade 5. The other side edge 9 being beveled as shown in Fig. 4 to form the hoeing portion of blade 5.

The projection 10 on lower side of blade 5 is tapered in thickness and width toward the bottom also cut V shaped at base to provide two points 11 so projection 10 can be pressed in ground freely.

The sides of projection 10 are provided with saw teeth 12 to a suitable length from base, the purpose of which is to destroy roots of weeds as it is pressed into and drawn through the soil in a hoeing manner.

I claim:

A combination weed grubber and hoe, a flat blade with a tapering extension having a suitable handle attached at right angles thereto, the extension being cut V shaped at base to provide two points and with saw teeth cut in both edges to a suitable distance from the end of the extension to form a weed grubbing tool.

In testimony whereof I affix my signature.

WILLIAM McMEANS.